May 3, 1927.                    W. G. HALL                    1,627,284
                JUICE STRAINING SYSTEM FOR SUGAR CANE MILLS
                            Filed Jan. 29, 1926
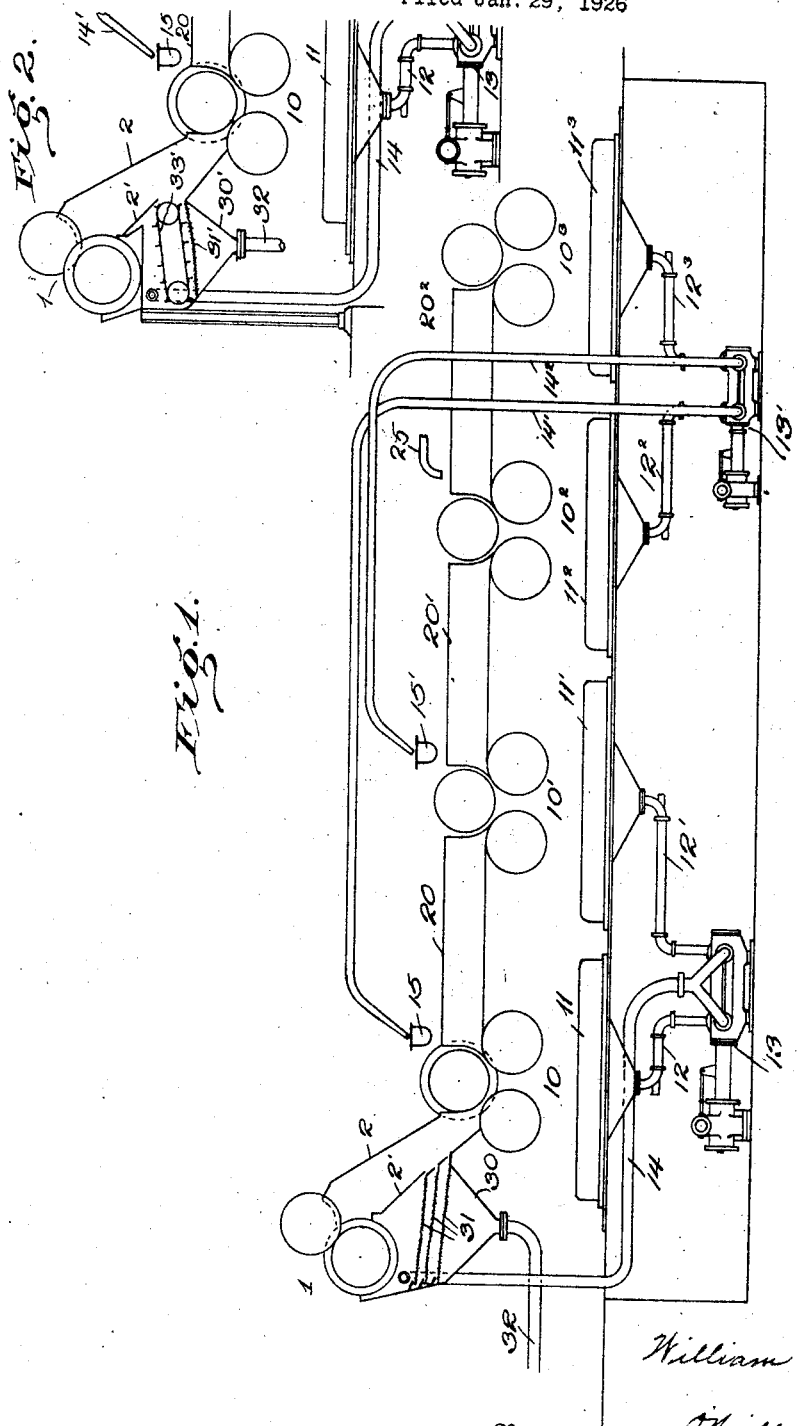
Inventor
William G. Hall
By O'Neill & Bunn
Attorneys Patented May 3, 1927.

1,627,284

UNITED STATES PATENT OFFICE.

WILLIAM G. HALL, OF HONOLULU, TERRITORY OF HAWAII.

JUICE-STRAINING SYSTEM FOR SUGAR-CANE MILLS.

Application filed January 29, 1926. Serial No. 84,659.

The invention relates to a juice straining system for sugar cane mills and has for its object to provide a simple and effective screening or straining device associated with the crusher or other equivalent preliminary unit of the mill, to receive the juice expressed by the crusher or similar unit and also to receive the mixed juice from the other mill units, the strainer device being associated with a receptacle to receive the juice, from which the same may be pumped directly to the boiling house.

The invention is illustrated in the accompanying drawings, in which:

Fig. 1 is a diagrammatic side elevation of a typical sugar cane mill provided with a preliminary crusher, with which the strainer device is associated.

Fig. 2 is a fragmentary side elevation showing a modification of the strainer device.

Referring to Fig. 1 of the drawings, 1 indicates a typical crusher through which the cane is passed and by means of which a large percentage of the juice is immediately expressed. Said crusher is connected by a chute 2 with the first roller unit 10 of the mill. As illustrated, there are four roller units 10, 10', 10² and 10³, each successively connected by intermediate conveyers 20, 20', and 20², said intermediate conveyers serving to pass the bagasse from one mill to the next. Juice pans 11, 11', 11² and 11³ are disposed below each of the corresponding mill units, the pans 11 and 11' being connected by discharge pipes 12 and 12' with a pump 13, the discharge of which is connected by a pipe 14 adapted to deliver the mixed juice from the several mills to the strainer device, as will be hereinafter explained. The pans 11² and 11³ are connected by pipes 12² and 12³, respectively, to pump 13', which is provided with two discharge pipes 14' and 14², the former delivering the juice expressed by the third mill unit 10' to a distributor 15 disposed above the intermediate conveyer 20 between the first and second mill units, the juice so delivered being then distributed over the bagasse on the conveyer and serving as maceration. The discharge pipe 14² delivers the juice expressed by the final unit 10³ of the mill and the maceration water delivered by pipe 25 to the bagasse on the intermediate conveyer 20², to a distributor 15' located above the intermediate conveyer 20' between the second and third roller units, the mixture of juice and water serving as maceration for the bagasse on said conveyer 20'. By this distributing arrangement, all of the mixed juice from the several roller units is ultimately delivered to the pump 13 and forced by the latter through pipe 14 to the strainer device.

Located below and partially surrounding the lower roller of the crusher 1 is a receptacle 30 into which the large proportion of the juice expressed by the crusher passes directly, running down over the front of said roller, while the crushed cane passes down the inclined bottom 2' of the chute 2. The receptacle 30 is provided with a hopper-like bottom, above which is located one or more screens or strainers 31, which extend entirely across the receptacle, and are preferably provided with means for oscillating them to cause any solid material lodging upon them to be moved forward and discharged over the front edges of the screens into the chute 2. To facilitate the discharge of the solid material lodging on the screens, the latter are preferably inclined toward the chute. The discharge pipe 14 from the pump 13 is connected to the receptacle 30 above the screens 31 therein and serves to deliver the mixed juices from the roller mill units above the screens, so that the mixed juice from the several roller units and the juice expressed by the crusher is effectively strained by the screens 31 and the entire body of juice discharged from the receptacle 30 by pipe 32 to the boiling house, while the cush cush carried by the mixed juice from the several roller units and the bits of cane, which may pass through the bottom 2' of the chute 2, are arrested by the screens and ultimately discharged from the surfaces of the latter into the chute, whence they are passed through the several roller units of the mill with the crushed cane.

In Fig. 2, the same general coordination of mill units is employed, the only difference being in the construction and arrangement of the strainer device. In this case, the strainer comprises a casing 30' arranged below the crusher and the chute 2 and is provided with a fixed screen 31' located above the hopper-like bottom of the receptacle 30', with an endless chain scraper 33' arranged above the screen, the slats or blades of the scraper engaging the upper surface of the screen and serving to scrape any cush cush or broken cane that may be lodged upon the screen off of the latter and into the chute 2. The chain scraper may be operated by a suitable connection with any of the rotary units of the mill, as will be understood. The discharge pipe 14 from the pump 13 delivers all of the mixed juice from the roller units of the mill to the receptacle 30' above the screen 31', so that the juice expressed by the crusher 1 and the mixed juice from the other mill units is effectively strained and all foreign material removed therefrom by the screen 31 and is ready for immediate delivery to the boiling house by way of discharge pipe 32 connected to the bottom of the receptacle 30'.

What I claim is:

1. The combination of a sugar cane mill, including a preliminary crusher and a chute connecting the crusher with the first mill unit, a chamber below the crusher and offset from the bottom of the chute, a screen dividing said chamber into upper and lower sections, a strained juice discharge for the lower section, means for delivering the mixed juice from the roller mill units to the upper section, and means for discharging the solid material lodging on the screen into the chute.

2. The combination of a sugar cane mill, including a preliminary crusher and a chute connecting the crusher with the first mill unit, a chamber below the crusher and offset from the bottom of the chute, a screen dividing said chamber into upper and lower sections, a strained juice discharge for the lower section, means for delivering the mixed juice from the roller mill units to the upper section, and a scraper engaging the screen for discharging the solid material lodging thereon into the chute.

In testimony whereof I affix my signature.

WILLIAM G. HALL.